… … …

United States Patent Office 3,210,638
Patented Oct. 5, 1965

3,210,638
INVERTERS AND CONVERTERS
Alec Hervey Bennett Walker, London, England, assignor to Westinghouse Brake and Signal Company Limited, London, England
Filed Jan. 2, 1962, Ser. No. 163,781
Claims priority, application Great Britain, Jan. 5, 1961, 552/61
2 Claims. (Cl. 321—18)

This invention relates to inverters or converters.

In the context of this specification, "inverter" means a piece of apparatus for converting D.C. to A.C., and a "converter" is for converting D.C. at one voltage to D.C. at another voltage, commonly comprising an inverter followed by a rectifier.

An inherent disadvantage of semi-conductor inverter circuits so far proposed is that the output voltage varies considerably with changes of the load connected to the A.C. output of the inverter.

Another disadvantage of such inverters is that the output voltage varies with the D.C. input voltage.

A further disadvantage of such inverters is that the output voltage cannot be easily varied unless alternative tappings are provided on the output winding and the load is connected to one or other of these. Such an arrangement does not permit continuous control or lend itself to automatic voltage control or adjustment.

The object of this invention is to provide a means of varying the output voltage of an inverter smoothly and continuously without waste of power or loss of efficiency. It will be apparent that this new facility may be used either to vary the output voltage over a given range where this is required, or alternatively this new facility may be used to compensate for variations in output voltage which would otherwise arise as a result of variations in input voltage or variations in the load connected to the inverter.

The invention consists in an inverter or converter comprising a transformer having primary and secondary windings, the primary winding having centre and symmetrical tapping points, a pair of direct current input terminals connected to the primary, a pair of output terminals connected to the secondary, one input terminal being connected to the centre tapping of the primary and the other between pairs of controllable semi-conductor devices to respective symmetrical tapping points on the primary, and a pulse drive circuit for the controllable semi-conductor devices for regulating the output voltage of the inverter by changing the transformer tapping points at controllable instants intermediately in each half-cycle.

When used for automatic control there is provided means for sampling the current or voltage at the output side and for comparing with a reference and supplying an output corresponding to the difference to the means for varying the pulse drive.

A convenient controllable semi-conductor device is a trinistor. A trinistor is a three-terminal four-layer p-n-p-n silicon switch. The cathode layer is the outer n-layer and the anode the outer p-layer. The third terminal is connected to the inner p-layer. The trinistor is normally non-conducting in both directions but may be made conducting in the forward direction by application of a control signal to the third terminal. Reduction of the current below a certain minimum value or application of a suitable control signal will turn the trinistor off.

The invention will be further described with reference to the accompanying drawings.

Figure 1:
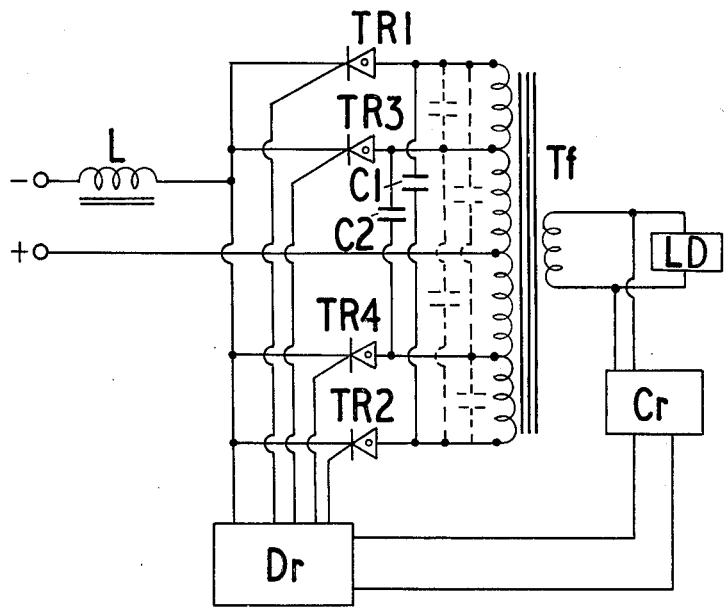
FIGURE 1 is a circuit diagram of a form of the invention.

In FIGURE 1 transformer Tf is provided with a centre-tapped primary winding having at least four tappings symmetrically disposed in pairs on either side of the centre tap. One pole of the direct current supply is connected to the transformer centre tap and the tappings on one side of the centre tap are returned to the choke L and thence to the other pole of the direct current supply through silicon controlled rectifiers or trinistors TR1, TR3, while the tappings on the other side of the centre ttap are returned to the choke L and thence to the other pole of the direct current supply through trinistors TR2 and TR4. A capacitor C1, termed in the art a commutating capacitor, is connected between the extremes of the primary winding and if required a second commutating capacitor C2 is connected between the two inner tappings on the primary winding. Alternatively, the commutating capacitors may be cross connected as shown dottted.

A generator of firing pulses Dr having independent output circuits is connected to all trinistors and is capable of rendering any of the trinistors potentially conducting at any desired moment by the injection of a suitable firing pulse into the gate or control electrode of the trinistors.

The firing pulse generator Dr is controlled from a voltage sensing device Cr which is connected across the secondary of transformer Tf and the load LD. Cr is a voltage-sensing device which produces an output dependent on the deviation of the inverter output voltage from a pre-determined value. There are a number of well-known ways in which this may be arranged; for example, the inverter output voltage may be rectified and smoothed and applied to the base of a transistor whose emitter is held at a constant reference potential by means of a zener diode, the output signal being developed across a collector load.

Dr is a pulse generator which produces firing pulses for trinistors TR1 and TR2 at regular intervals and further firing pulses for trinistors TR3 and TR4 which lag those for TR1 and TR2 by a phase angle which is preferably controlled by a control signal, which may be the output of Cr, in such a way that a decrease in the output voltage of the inverter results in a smaller phase lag. The controllable phase lag may be produced by a variable phase-shift-network embodying a reactance and a variable resistance, by a saturable reactor or magnetic amplifier, or by an electronic method in which a switching circuit is controlled by superimposed A.C. and D.C. signals, or in which the charging time of a capacitor is varied by controlling its charging current. All these systems are well-known.

Considering first the operation of the circuit at light loads, high variations of input voltage or under any other conditions where the output voltage is required to be set to a minimum. Under these conditions trinistors TR1 and TR2 are fired alternately by pulses from the pulse generator and the current from the direct current supply flows alternately through trinistor TR1 and trinistor TR2 and generates an alternating voltage in transformer Tf and the load. As is well known in the art, the action of the commutating capacitor is to reduce the current in the conducting trinistor momentarily to zero when the opposing trinistor is fired, so permitting it to recover its blocking facility. Thus far the operation is normal and is well known in the inverter art.

Upon one trinistor, for example TR1, being fired, the D.C. supply is connected via L and TR1 across one half of the transformer primary winding, a corresponding voltage appearing at the load terminals, and the commutating capacitor C1 connected between the anodes of TR1 and TR2 is charged so that its upper plate is negative (the other capacitors can for the moment be disregarded). When TR2 is fired after an interval equal to half the required period, the charge on the capacitor C1 is applied in reverse across TR1, which thereby ceases to conduct and regains its forward blocking characteristic, assuming the charge on the capacitor to be adequate. With TR2 now conducting, the supply is connected to the other half of the transformer primary winding, the voltage supplied to the load is reversed, and the capacitor C1 is charged so that the upper plate is positive. When TR1 is again fired at the end of the cycle, TR2 is turned off in a simliar manner to that described, and the cycle is repeated. The voltage applied to the load normally has an approximately square waveform if the frequency of operation is low, but tends towards the sinusoidal at high frequencies, depending on the inductance of L and the commutating capacitance, and possibly on the characteristics of the transformer.

Consider now either that the load is increased, or the direct current input voltage falls, or that for any other reason it is desired to increase the output voltage.

It is now arranged that some variable time period after the initiation of conduction in, say, trinistor TR1, and still within the half-cycle of alternating voltage during which trinistor TR1 would otherwise have remained conducting, trinistor TR3 is rendered conducting by a suitable firing pulse from the pulse generator. The current from the direct current supply which is flowing through trinistor TR1 will now tend to flow through trinistor TR3 since trinistor TR1 is connected to a tapping of lower potential with respect to the centre tap and the other pole of the direct current supply and the current will therefore transfer from trinistor TR1 to trinistor TR3 at a rate dependent upon the reactance of the portion of the transformer winding between the two outer taps without the generation of voltage transients since such transfer of current is not forced by the external circuit and can occur at the natural rate determined by the reactances of the transformer and commutating capacitors. Therefore in a period of time which is brief in relation to the time of one half-cycle of the generated frequency the current will have been transferred entirely to trinistor TR3 and trinistor TR1 will be cut off by the reversal of voltage across it. By this means the direct current supply becomes connected to a smaller number of primary turns, and since the sum of the transformer TR3 primary voltage and the voltage drop in the choke L must at all trinistor conducting times remain equal to the direct current supply voltage neglecting the small forward voltage drop in the trinistors the voltage supplied to each turn of the transformer primary winding becomes increased, thereby increasing the voltage generated in the secondary winding which is connected to the load.

This condition of conduction through trinistor TR3 and corresponding increased output voltage will persist until the end of the half-cycle under consideration when trinistor TR2 is rendered conducting and the current through trinistor TR3 is reduced to zero by the normal action of the commutating capacitors.

The same sequence of events occurs on the following half-cycle when conduction will commence in trinistor TR2 and will be transferred to trinistor TR4 at a later instant in this half-cycle.

If at the end of a particular half-cycle TR3 is conducting and TR2 is next to be fired, the turning-off of TR3 would be effected exactly as described above for TR1 if there were a commutating capacitor connected between the anodes of TR3 and TR2; however, if the coupling between various parts of the transformer primary winding is sufficiently close, the operation of the circuit will be the same with the capacitor connected to any two points on the primary winding (and similarly it could be possible to connect it to the secondary winding or to an extra winding or overwind), so that a single capacitor will suffice to enable TR1 or TR3 to be turned off by firing TR2 or TR4. If the transformer coupling is not sufficiently close for this to be so, additional capacitors may be connected as indicated in the drawing.

Since the output voltage may be increased by transferring conduction to trinistors TR3 and TR4 and since the instant of transfer in each half-cycle may be varied by varying the instant in each half-cycle at which trinistors TR3 and TR4 are rendered conducting the output voltage appearing at the load may be smoothly and progressively varied from a minimum output voltage when only trinistors TR1 and TR2 are used to a maximum output voltage when transfer to trinistors TR2 and TR3 is effected very close to or at the commencement of each half-cycle.

The firing pulses supplied by the firing pulse generator will therefore comprise fixed phase pulses supplied to trinistors TR1 and TR2 and variable phase pulses supplied to trinistors TR3 and TR4. The firing pulse generator may be designed so that the variation in the phase of the firing pulses supplied to trinistors TR3 and TR4 is under direct manual control by manual variation of the constants of components included therein or the firing pulse generator may be designed so that the phase of the variable pulses supplied to trinistors TR3 and TR4 is varied by an electrical control signal applied to the firing pulse generator in which case the electrical control signal may be under direct manual control by external means or may be derived from a voltage or current sensing device or circuit Cr which is connected to the output of the inverter thereby providing automatic control of the output voltage supplied to the load LD and so compensating automatically for variations in the direct current supply voltage or for changes in the magnitude of the load connected to the inverter.

Figure 2:
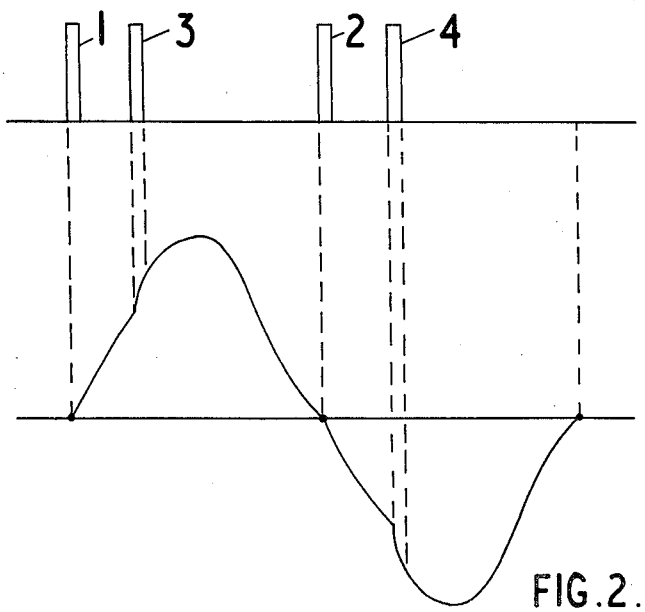
FIGURE 2 is a graph showing the operation of the circuit of FIGURE 1.

FIGURE 2 will clarify the principle of operation.

At the top of FIGURE 2 is shown a graph of firing pulses on a time base. Pulses 1 and 2 are the fixed phase firing pulses to trinistors TR1 and TR2. Pulses 3 and 4 are the variable phase firing pulses to trinistors TR3 and TR4.

Below is shown a curve of current in the load against time. The current curve has first a rising part when trinistor TR1 is conducting, followed by a steeply rising, flattening off and falling part when trinistor TR3 is conducting. When the current falls to zero trinistor TR4 becomes conducting for the first part of the negative portion of the current curve, followed by a steeply falling, flattening off and rising portion of the curve when trinistor TR4 is conducting.

It will be apparent to those skilled in the art that transistors may if desired be used in place of trinistors but in that case the firing pulse signal must be maintained during the whole of the period for which the transistors are required to be conducting. Further, since transistors may be rendered non-conducting by the cessation of the drive signal from the generator commutating capacitors are not strictly necessary if transistors are used.

Otherwise operation will be identical with that for using trinistors.

It will also be apparent to those skilled in the art that if desired a multiplicity of taps and trinistors on each half of the transformer primary winding may be used, the firing pulses being suitably phased in sequence so that the current from the direct current supply commutates from one trinistor to the next proximate to it in sequence towards the centre tap during each half-cycle at instants controlled by the phase of the firing pulses. Where a wide range of control is required this arrangement permits a reduction of the distortion of the voltage wave-form which might otherwise be considered excessive for some applications if a wide range of control were attempted with the use of only two taps and two trinistors on each side of the transformer centre tap.

Various other modifications may be made within the scope of the invention. Thus, it will be apparent to those skilled in the art that the arrangement of the invention may be applied to multiphase inverters.

I claim:

1. An inverter comprising a transformer having primary and secondary windings, the primary winding having centre and symmetrical tapping points, a pair of direct current input terminals connected to the primary, a pair of output terminals connected to the secondary, one input terminal being connected to the centre tapping of the primary and the other between pairs of silicon controlled rectifiers to respective symmetrical tapping points on the primary, and a pulse drive circuit for the silicon controlled rectifiers for regulating the output voltage of the inverter by changing the transformer tapping points at controllable instants intermediately in each half-cycle.

2. An inverter as claimed in claim 1 in which the silicon controlled rectifier is a trinistor and comprising commutating capacitors connected across the symmetrical tapping points of the primary of the transformer.

References Cited by the Examiner

UNITED STATES PATENTS 2,959,726  11/60  Jensen ---------------- 321—18

LLOYD McCOLLUM, *Primary Examiner.*